US007740235B2

(12) United States Patent
Schneider

(10) Patent No.: US 7,740,235 B2
(45) Date of Patent: Jun. 22, 2010

(54) MOUNT FOR EQUIPMENT FOR CONVEYING PERSONS

(75) Inventor: Marcel Schneider, Kriens (CH)

(73) Assignee: Inventio AG, Hergiswil NW (CH)

( * ) Notice: Subject to any disclaimer, the term of this patent is extended or adjusted under 35 U.S.C. 154(b) by 975 days.

(21) Appl. No.: 11/364,222

(22) Filed: Feb. 28, 2006

(65) Prior Publication Data

US 2006/0205266 A1 Sep. 14, 2006

(30) Foreign Application Priority Data

Mar. 8, 2005 (EP) ................................. 05405225

(51) Int. Cl.
*F16F 7/12* (2006.01)
*F16F 1/36* (2006.01)

(52) U.S. Cl. ....................... 267/141; 267/153; 248/634; 248/633

(58) Field of Classification Search ................. 267/153, 267/292, 136, 140, 141, 142, 145, 146, 80, 267/280; 248/634, 638, 633, 615, 644
See application file for complete search history.

(56) References Cited

U.S. PATENT DOCUMENTS 2,088,113 A * 7/1937 Madison ..................... 428/138
3,026,224 A * 3/1962 Rogers, Jr. .................. 428/167
5,027,925 A 7/1991 Kahkipuro
5,330,165 A * 7/1994 van Goubergen ........... 267/141
6,382,603 B1 * 5/2002 Monson et al. ............... 267/80
7,300,032 B2 * 11/2007 Williams et al. ............ 248/633
2002/0117791 A1 * 8/2002 Hembree et al. ............ 267/152
2003/0155480 A1 8/2003 Cholinski et al.

FOREIGN PATENT DOCUMENTS

| | | |
|---|---|---|
| DE | 24 41 882 | 3/1976 |
| EP | 0 985 625 | 3/2000 |
| JP | 05024769 | 2/1993 |
| WO | WO2005/044710 | 5/2005 |

* cited by examiner

*Primary Examiner*—David D Le
*Assistant Examiner*—Ryan Dodd
(74) *Attorney, Agent, or Firm*—Fraser Clemens Martin & Miller LLC; William J. Clemens

(57) ABSTRACT

A mount having an insulation body is arranged between a bearer and an elevator drive, wherein a fastening connects the elevator drive with the bearer. Plugs are embedded in the insulation body, wherein the plugs distributed in a grid-like manner in rows and columns over the insulation body. The plugs, which can be broken out, enable a uniform spring deflection in the case of different loading. The insulation body required for the respective application can be produced by breaking out the appropriate number of plugs.

5 Claims, 6 Drawing Sheets

MOUNT FOR EQUIPMENT FOR CONVEYING PERSONS

BACKGROUND OF THE INVENTION

The present invention relates to a mount for equipment for conveying persons, wherein an insulation body carries vibrationally loaded parts of the equipment for conveying persons and insulates them in terms of vibration relative to a support.

A resilient mount for the frame of an elevator drive is known from the published German specification DE 24 41 882, which consists of a rubber body provided with horizontal passages and which is arranged by a bearing surface on the support and by the opposite bearing surface below the supported frame and is connected by means of a clamping connection. Passages, by means of which a greater spring travel can be produced in the case of sufficient horizontal stability, are provided in the rubber body.

A disadvantage of this known equipment resides in the fact that the rubber body is designed merely for a specific loading.

SUMMARY OF THE INVENTION

The present invention meets the object of avoiding the disadvantages of the known equipment and of creating a mount, which is adaptable to the loading, with an insulation body.

The advantages achieved by the present invention are essentially that the spring travel or the spring deflection of the mount or the insulation body is settable in accordance with the respective loading. Elevator drives with different weight and for different loads or cable fixing points for different loads or escalators or moving walkways of different size or the drive engines thereof can be insulated in terms of vibration relative to the support by the mount according to the present invention or by the insulation body, wherein insulation bodies of the same Shore hardness are usable. Plugs which are embedded in the insulation body and can be broken out enable a uniform spring deflection in the case of different loading. The insulation body required for the respective application can be produced from the insulation body according to the present invention in that an appropriate number of plugs is broken out. One insulation body with a Shore hardness suffices for different loadings, wherein the required spring deflection is settable by means of the plugs able to be broken out. Production costs can thereby be significantly reduced by large batch numbers. Moreover, the logistics (stock-keeping, stock management, distribution, assembly, etc.) are simplified.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
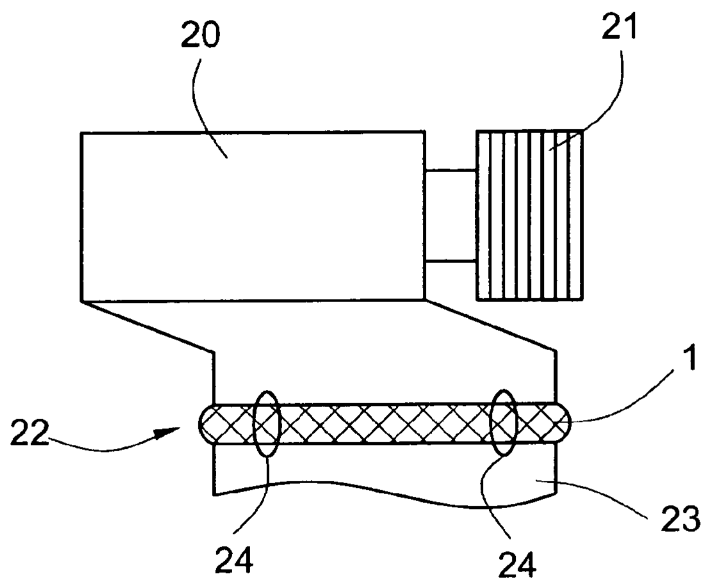
FIG. 1 is a schematic elevation view of an elevator drive engine with a mount according to the present invention.

FIG. 1 shows an elevator drive 20 with a drive pulley 21 for driving an elevator car (not shown) movable in an elevator shaft. A mount 22 insulates the elevator drive 20, which accepts vertical loads, in terms of vibration relative to a bearer or support 23, wherein the elevator drive 20 is connected with the bearer 23 by means of at least one fastening 24.

The mount 22 can also be used for cable fixing points receiving vertical loads or for parts, which receive vertical loads, of escalators or moving walkways, such as, for example, the drive engines thereof.

Figure 2:
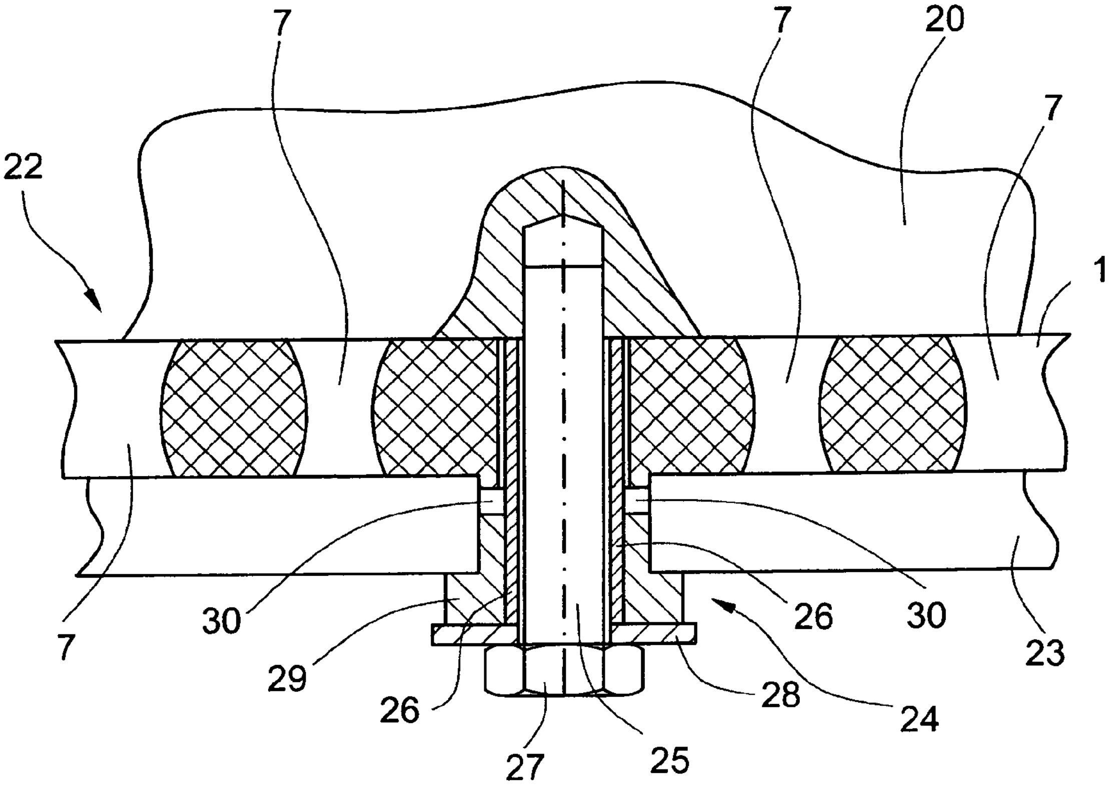
FIG. 2 is an enlarged fragmentary view showing details of the mount of FIG. 1.
Figure 10:
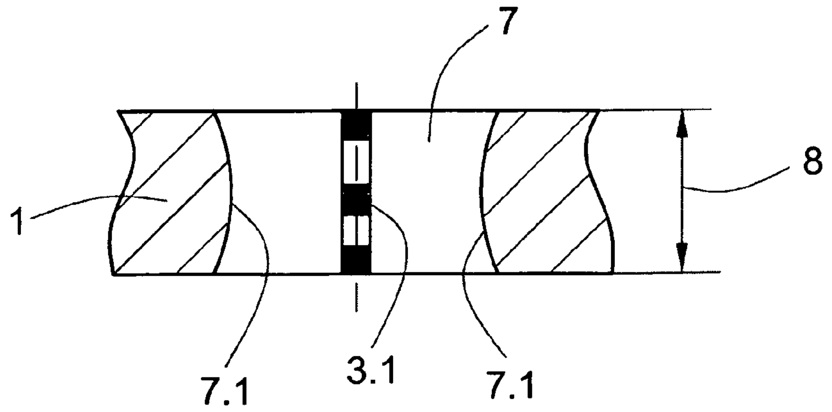
FIG. 10 is a view similar to FIG. 8 of the insulation body without a plug in a loaded state.

FIG. 2 shows details of the mount 22, consisting of at least one insulation body 1 according to the present invention and at least one of the fastening 24, wherein the insulation body 1 is arranged between the bearer 23 and the elevator drive 20 and the fastening 24 connects the elevator drive 20 with the bearer 23. The fastening 24 consists of a screw or bolt 25 which penetrates a spacer sleeve 26 and is screwed at one end to the elevator drive 20. At the other end the screw 25 has, for example, a hexagon head 27 against which a washer 28 rests, wherein the spacer sleeve 26 is clamped between the washer 28 and the elevator drive 20. A spring element 29 which extends into a recess 30 of the bearer 23 and can give with the spring deflection of the insulation body 1 produced by the loading is provided between the washer 28 and the bearer 23. Details of the insulation body 1 under load are shown in FIG. 10.

Figure 3:
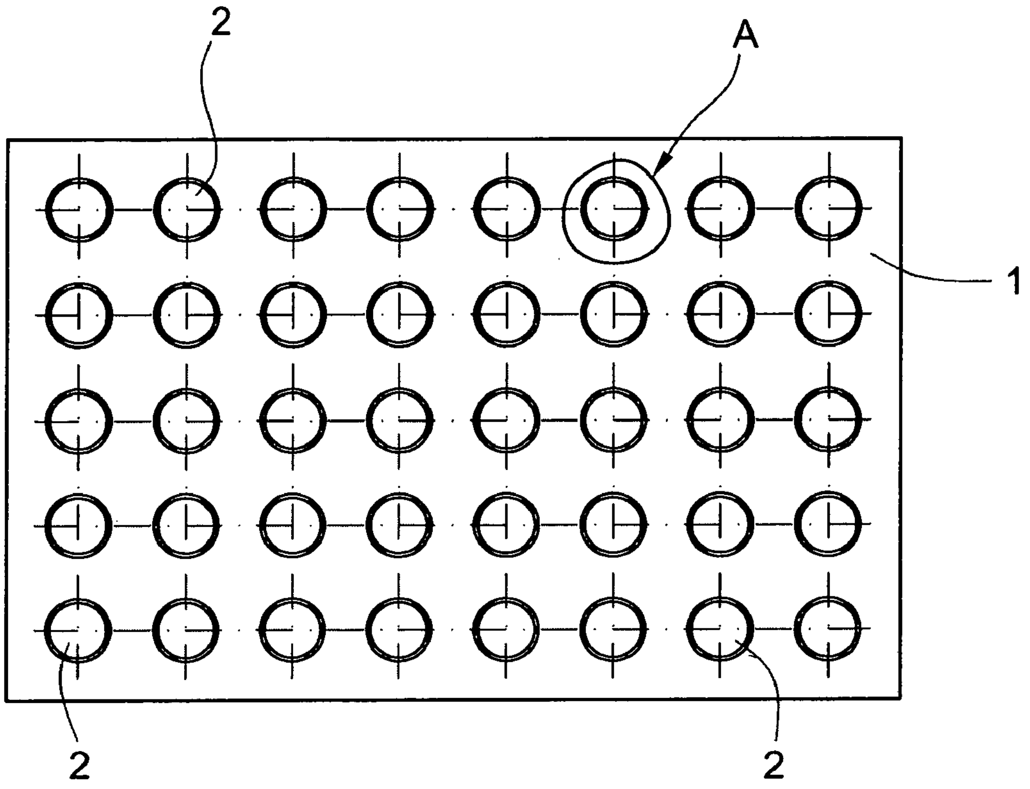
FIG. 3 is a plan view of an insulation body, according to the present invention, of the mount shown in FIG. 1.

FIG. 3 shows the insulation body 1, according to the present invention, of the mount 22 for items of equipment for conveying persons (elevator drives with different weight or cable fixing points for different loads or escalators or moving walkways of different size), wherein the insulation body 1 carries vibrationally loaded parts, which accept vertical loads, of the equipment for conveying persons and insulates them in terms of vibration relative to a support, for example the bearer 23.

The insulation body 1 is, for example, plate-shaped and has the dimensions 340×256×20 millimeters. Other body shapes and dimensions are also possible. Spring bodies, for example plugs 2, are embedded in the insulation body 1, wherein the plugs 2 are arranged to be distributed in a grid-like manner in rows and columns over the insulation body 1. Other arrangements, for example spiral or circular arrangements, are also possible. The plugs 2 usually consist of the same resilient material (for example natural rubber with high elasticity and high mechanical properties) as the insulation body 1. Different materials for the plugs 2 and the insulation body 1 are also conceivable. Instead of the plugs 2 being circular in cross-section it is also possible to provide square, triangular or spherical spring bodies or spring bodies of other shapes.

Figure 4:
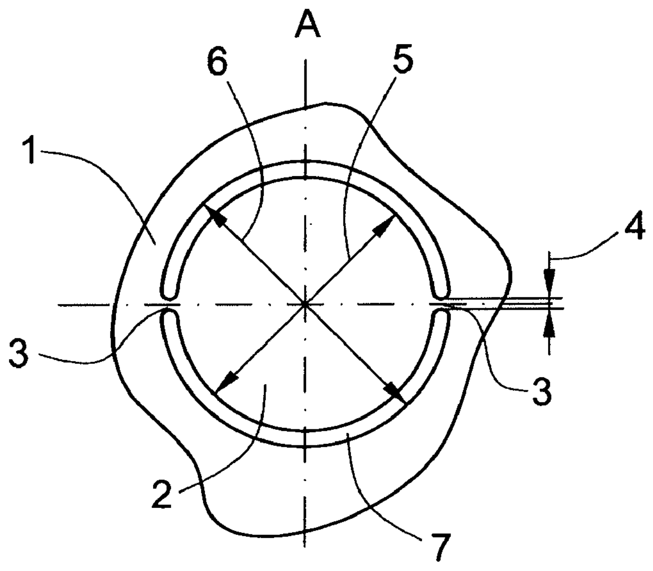
FIG. 4 is an enlarged detail of area "A" in FIG. 3 of the insulation body with embedded plugs.
Figure 9:
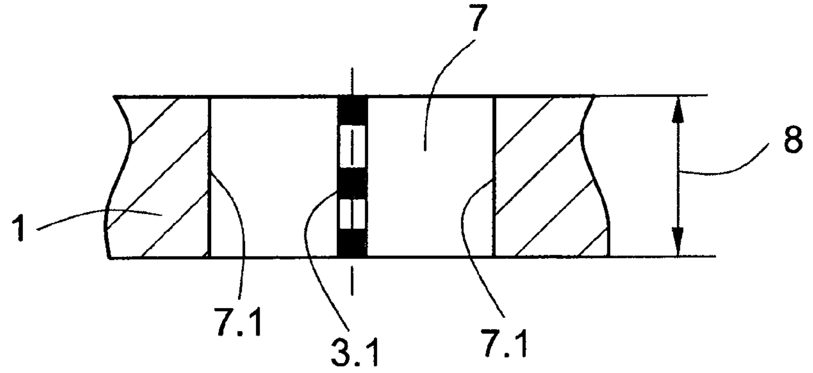
FIG. 9 is a partial cross-sectional view of the insulation body without a plug shown in FIG. 8 in an unloaded state.

FIG. 4 shows a detail area "A" of the insulation body 1 with the plug 2 according to FIG. 3. In FIG. 4, the plug 2 is shown circularly round. The plug 2 can also have different body shapes, such as, for example, a cylinder with oval plan. The plug 2 is connected with the insulation body 1 by means of webs 3, wherein the webs 3 extend, for example, over the entire height of the insulation body 1 as shown in FIG. 9. The webs 3 can have, for example, a width 4 of one millimeter. A diameter 5 of the plug 2 can be, for example, thirty millimeters, wherein a diameter 6 of an opening 7 for reception of the plug 2 is, for example, thirty-two millimeters.

Figure 5:
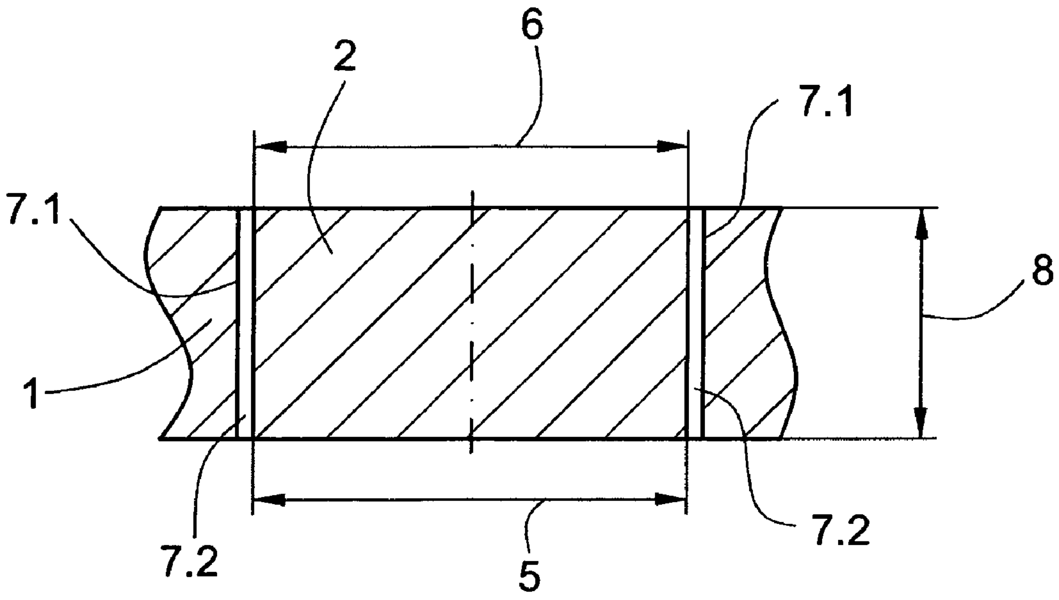
FIG. 5 is a partial cross-sectional view of the insulation body and plug shown in FIG. 4 in an unloaded state.

FIG. 5 shows a section through the insulation body 1 and the plug 2 in an unloaded state. The insulation element 1 and the plug 2 have a height 8 of, for example, twenty millimeters. A play 7.2 between the plug 2 and a wall 7.1 of the opening 7 of, for example, one millimeter is clearly apparent.

Figure 6:
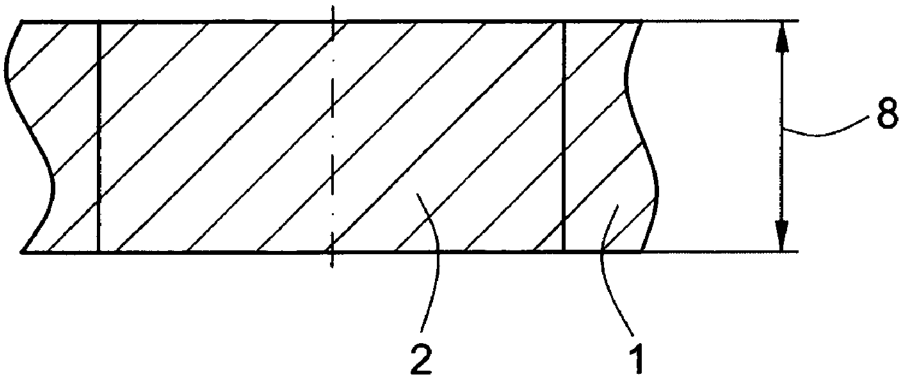
FIG. 6 is a view similar to FIG. 5 of the insulation body and plug in a loaded state.

FIG. 6 shows a section through the insulation body 1 and the plug 2 in a loaded state. Due to the loading the insulation element 1 and the plug 2 have been slightly compressed and have a height 8 of, for example, nineteen millimeters. The plug 2 has expanded radially to completely fill the opening 7.

Figure 7:
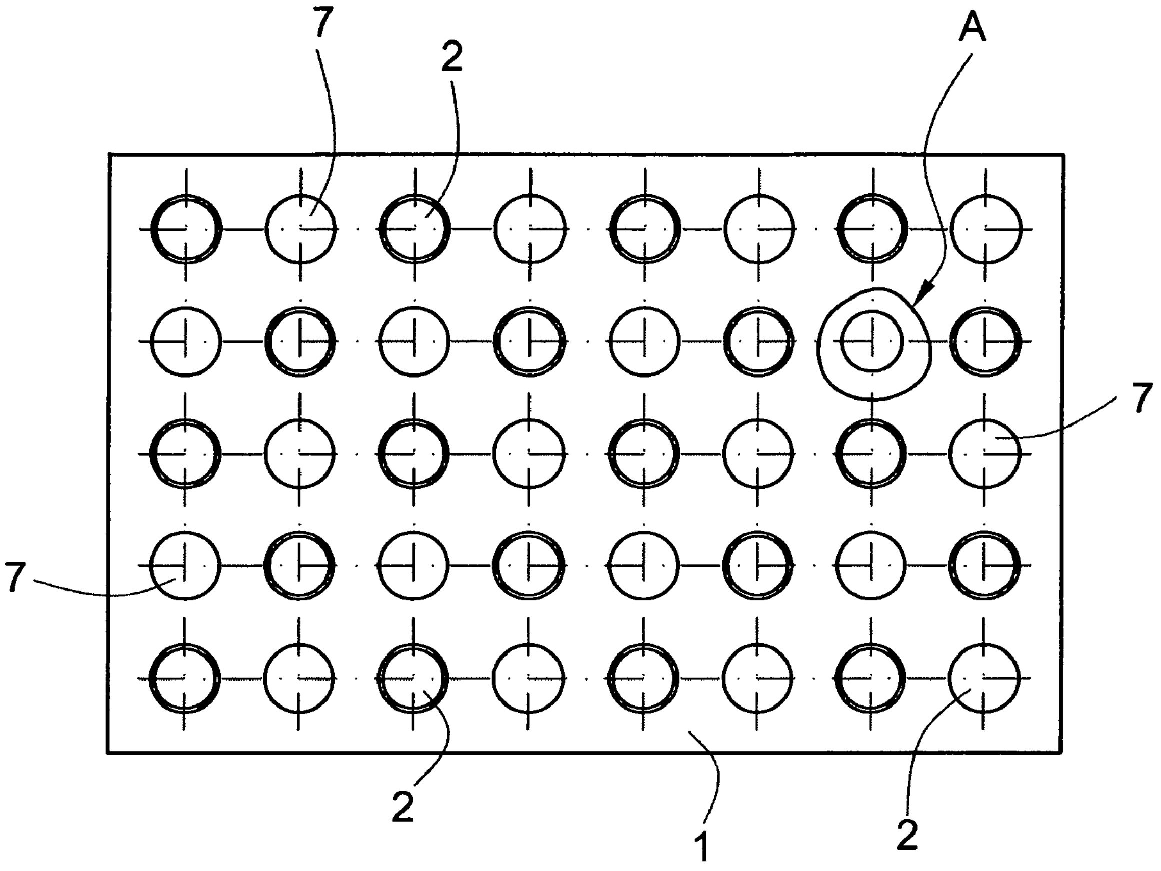
FIG. 7 is a view similar to FIG. 4 of the insulation body with broken-out plugs.

FIG. 7 shows the insulation body 1 with broken-out ones of the plugs 2. Circles with thick lines represent the intact plugs 2. Circles with thin lines represent the openings 7 either without one of the plugs 2 originally or with the plug 2 broken-out.

Figure 8:
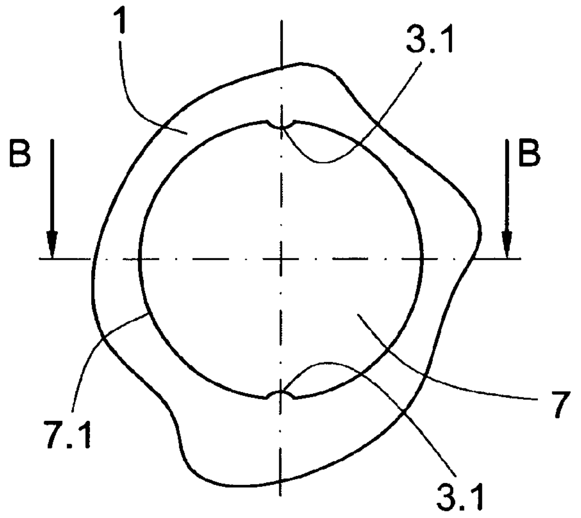
FIG. 8 is an enlarged detail of area "A" in FIG. 7 of the insulation body with broken-out plugs.

FIG. 8 shows a detail area "A" of the insulation body 1 with the broken-out plug 2 according to FIG. 7. Of the cut-through web 3, a remaining web protrusion 3.1 at the insulation body 1 is visible.

FIG. 9 shows a section B-B in FIG. 8, wherein the insulation body 1 with the broken-out plug 2 is in an unloaded state. The height 8 of the insulation body 1 is, as mentioned above, for example twenty millimeters.

FIG. 10 shows the section B-B of FIG. 8, wherein the insulation body 1 with the broken-out plug 2 is in a loaded state. Due to the loading the insulation element 1 has been slightly compressed and has, as explained above, a height 8 of, for example, nineteen millimeters. The opening wall 7.1 has been slightly bulged by the loading.

Figure 11:
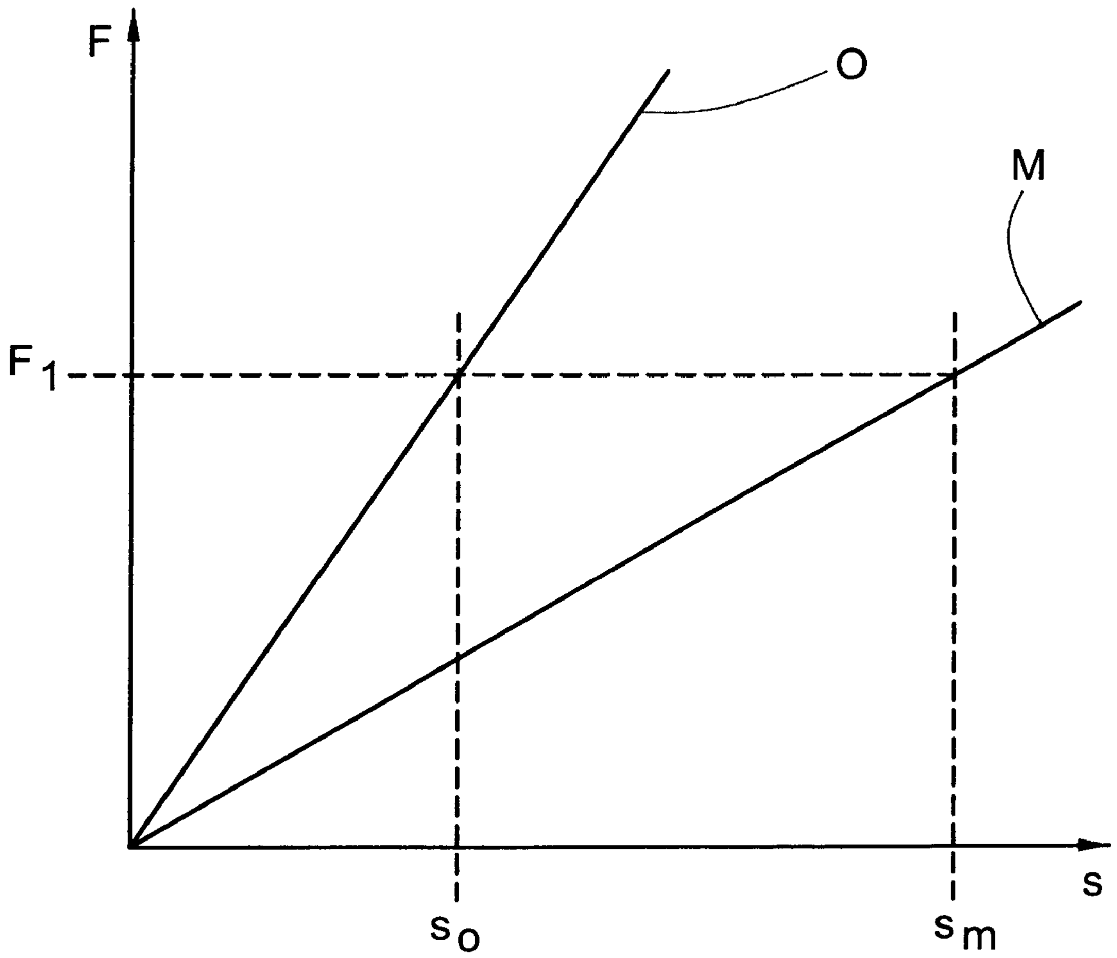
FIG. 11 is a diagram with the spring deflection as a function of loading of the insulation body according to the present invention.

FIG. 11 shows a diagram with the spring travel "s" as a function of the loading or the force "F" on the insulation body 1. Curve O shows the characteristic of the insulation body 1 with the plug 2 in place and curve M shows the characteristic of the insulation body 1 with the plug 2 broken-out. In the case of a specific loading of the insulation body 1, or force F, on the insulation body 1, there results at the curve O a spring deflection travel $s_o$ and in the cash of the curve M a spring deflection travel $s_m$, wherein $s_o<s_m$. The play 7.2 between the plug 2 and the wall 7.1 of the opening 7 is not considered, wherein the curves O, M are coincident within the play 7.2 and thereafter rise differently with a slight kink, approximately as shown.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mount for insulating a support from conveying equipment connected to the support, the conveying equipment including at least one vibrationally loaded part accepting a vertical load, the mount comprising:

an insulation body for positioning between the at least one vibrationally loaded part and the support, wherein said insulation body is formed of a spring material and has a plurality of openings formed therein, the openings being aligned in parallel with a vector defined by the vertical load on the at least one vibrationally loaded part, the openings disposed through the insulation body from a top side of the insulation body to a bottom side of the insulation body; and a plurality of spring bodies, each of the spring bodies positioned in one of said openings formed in the insulation body, wherein at least one of the spring bodies is individually removably attached to said insulation body, and a spring travel characteristic of said insulation body is settable according to the vertical load on the vibrationally loaded part by the individual selective removal of at least one of said spring bodies from at least one of said openings, the spring travel characteristic being a function of the vertical load on the insulation body and the selective positioning of the spring bodies in the openings of the insulation body.

2. The mount according to claim 1 wherein the openings are arranged in a plurality of rows and a plurality of columns across a surface of the insulation body, each of said openings having an associated spring body positioned therein.

3. The mount according to claim 1 wherein said spring body is removably attached to the insulation body by at least one web, and can be separated from said insulation body for removal by breaking the at least one web.

4. The mount according to claim 3 wherein said at least one spring body is a plug.

5. A method for insulating a support from conveying equipment connected to the support, the conveying equipment including at least one vibrationally loaded part accepting a vertical load, the method comprising the steps of:

a. forming an insulation body with a spring travel characteristic;

b. forming a plurality of openings in the insulation body, the openings being aligned in parallel with a vector defined by the vertical load on the at least one vibrationally loaded part, the openings disposed through the insulation body from a top side of the insulation body to a bottom side of the insulation body;

c. providing a plurality of spring bodies, each of the spring bodies positioned in one of said openings formed in the insulation body, wherein at least one of the spring bodies is individually removably attached to the insulation body;

d. evaluating the vertical load on the vibrationally loaded part;

e. selecting how many and which of the plurality of spring bodies to individually remove from the insulation body based on the vertical load on the vibrationally loaded part;

f. selectively individually removing the at least one of the spring body to set a spring deflection of the insulation body; and g. positioning the insulation body between the vibrationally loaded part and the support.

* * * * *